United States Patent Office 3,197,516
Patented July 27, 1965

3,197,516
STABLE SOLUTIONS OF ARYLLITHIUM COMPOUNDS
Donald L. Esmay, Coon Rapids, Minn., and Conrad W. Kamienski, Bessemer City, N.C., assignors to Lithium Corporation of America, Inc., New York, N.Y., a corporation of Minnesota
No Drawing. Filed Feb. 9, 1962, Ser. No. 172,110
12 Claims. (Cl. 260—665)

This invention is directed to highly stable solutions or aryllithium compounds and to methods of producing the same.

Solutions, as well as suspensions, of aryllithium compounds, exemplified by phenyllithium, have long been known. Examples thereof are diethyl ether solutions of phenyllithium; and suspensions of phenyllithium in benzene. Solutions of aryllithium compounds, such as diethyl ether solutions of phenyllithium, are unstable under conditions of ordinary storage due to the reaction of the phenyllithium with the ether. Suspensions of aryllithium compounds in inert liquid hydrocarbons, for example, suspensions of phenyllithium in benzene, while reasonably stable, have the objection that, due to their being in the form of suspensions (or slurries), they are difficult to handle.

The present invention is based upon certain discoveries, hereafter set forth in detail, which enable the production of novel solutions of aryllithium compounds, which possess the advantages of the solution form of the aryllithium compounds but obviate the heretofore existent disadvantages of said solutions, namely, their instability under conditions of storage.

Our invention is based, in part, on the discovery that when aryllithium compounds, exemplified particularly by phenyllithium, are dissolved in certain types of mixtures of inert liquid hydrocarbons and liquid ethers, hereafter described in detail, the resulting solutions are stable for at lease several months when stored in closed containers at room temperature. The ethers are utilized in amounts necessary to kep the aryllithium compounds, for instance, phenyllithium, in solution in tthe mixture of the ether with the inert liquid hydrocarbon, but less than that amount which will cause loss of the aryllithium compound to occur on storage. In general, in at least most cases, the inert liquid hydrocarbon will constitute from 50 to 80 volume percent of the solvent mixture and the ether will comprise from 50 to 20 volume percent of the solvent mixture.

Several different procedures have been evolved for preparing the novel and useful highly stable solutions of aryllithium compounds of the present invention. Particularly preferred procedures may be outlined as follows, it being understood, however, that other procedures may be utilized without departing from the novel principles and teachings provided herein:

(1) To a suspension of the aryllithium compound in an inert liquid hydrocarbon medium, an amount of a liquid ether is added sufficient to convert said suspension to an essentially clear solution. Thus, by way of example, a suspension of phenyllithium in benzene may first be prepared by a known procedure, namely, by treating a n-heptane solution of bromobenzene with a n-heptane solution of n-butyllithium, filtering to separate the precipitated phenyllithium from the produced solution of n-butylbromide and n-heptane, and suspending the phenyllithium in benzene. Then there is added to said suspension diethyl ether in portions until the phenyllithium just dissolves, the amount of diethyl ether required being about 1 mole for each mole of phenyllithium present.

(2) Providing a solution of the aryllithium compound in mixtures of a liquid ether and an inert liquid hydrocarbon by a procedure which involves, by way of example, preparing a solution of phenyllithium in a solvent mixture consisting of from 50–70 volume percent benzene and 50–30 volume percent ethyl ether by reacting a suspension of finely divided lithium metal in the above solvent mixtures with undiluted chlorobenzene, the molal ratio of chlorobenzene to ethyl ether being approximately 1. The desired final phenyllithium concentration is dependent on the amount of benzene added. The reaction mixture is filtered to remove the solid lithium chloride reaction product.

The liquid inert hydrocarbons which are utilized in the practice of the present invention may be selected from a wide group. These include aliphatic and cycloaliphatic compounds as, for instance, in the range of $C_5H_{12}$ to $C_{10}H_{22}$, examples of which are n-pentane, n-heptane, and 2,4-dimethylhexane; as well as mixtures of the foregoing and other paraffin hydrocarbons including mixtures of paraffin hydrocarbons such as petroleum ether; aromatic hydrocarbons such as benzene, toluene and xylene; and mixtures of aromatic and paraffinic solvents such as mineral spirits or lactol spirits.

A wide choice of ethers is also available for the practice of the present invention. These ethers comprise straight chain types such as diethyl ether, isopropyl ether, and n-butylether, and the like, and cyclic types of ethers examples of which are tetrahydrofuran and tetrahydropyran. It is particularly prefered to utilize such ethers as are substantially inert to the particular aryllithium compound whose solutions are to be prepared in accordance with the present invention.

While, in the particularly preferred embodiment of the present invention, the aryllithium compound is phenyllithium, various other aryllithium compounds, for instance, biphenyllithiums such as 2-biphenyllithium, 3-biphenyllithium and 4-biphenyllithium; alpha-naphthyllithium; and the thienyllithiums, namely, 2-thienyllithium and 3-thienyllithium, in the form of stable solutions thereof, are definitely contemplated and encompassed by this invention. These include also, by way of further example, the aryllithium compounds which result from the utilization, in the practice of the methods disclosed herein, of aryl halides such as monohalobenzenes, exemplified by chlorobenzene and bromobenzene; monohaloalkyl benzene compounds, exemplified by o,m,p-bromotoluenes, 2-chloro-4-methyltoluene, 2-bromo-3-ethyltoluene, and p-(isobutyl) phenylbromide; alkoxyaryl halides exemplified by o-anisylbromide, 3-isobutoxy-4-bromotoluene, and 2-chloro-3-methyl-4-ethoxytoluene; dialkylaminoarylhalides exemplified by p-bromodimethylaniline, and 2-bromo-3,4-dimethyl-N,N-diethylaniline; polynuclear arylhalides exemplified by α-bromonaphthalene, 4-bromobiphenyl, and 9-bromoanthracene; heterocyclic aryl halides, exemplified by 4-bromo-10-ethyl-phenothiazine; o-bromodiphenyl-sulfone, and 4-bromobenzothiophene; and aryl halides containing other metallic or metalloidal groups, exemplified by p-bromophenyl di-n-propylarsine, and p-bromophenyl trimethylsilane.

The concentration of the aryllithium compounds in the aforesaid solutions is variable and will range in general up to approximately 3 molar strengths.

Solutions of aryllithium compounds produced in accordance with the present invention have been tested for stability on storage. Loss of aryllithium compounds on prolonged storage, as shown by assay, has been found to be very slight to negligible. For example, a 0.87 molar solution of phenyllithium in benzene-diethyl ether, prepared in accordance with our invention, was stored in a closed container at room temperature for 10 months, during which the phenyllithium assay showed only a negligible change. A sample prepared by the first method described above showed only about a 2% decrease in phenyllithium assay after two years. Samples prepared by the second method have shown stability characteristics comparable to those prepared by the first method. In contrast to these results, the stability of solutions of phenyllithium and diethyl ether alone was distinctly inferior, showing a 10 to 20% loss in phenyllithium after storage for six weeks at room temperature. While the solutions of the present invention may vary in their content of aryllithium compounds, a particularly preferred class of solutions is that comprising from 0.7 to 2.5 molar solutions of, for example, phenyllithium in a mixture of benzene and diethyl ether, the benzene and diethyl ether being present in a volume ratio to each other of 100 parts of benzene to from 8 to 65 parts of diethyl ether, subject to the proviso that, in said final solutions, the diethyl ether is present in amounts in the range of that amount which is substantially just sufficient to complex with the phenyllithium but not substantially in excess of twice that amount.

It may be pointed out that it appears that the liquid ether forms a complex or etherate with the aryllithium compound, which complex or etherate is soluble in the inert liquid hydrocarbon. Hence, when, for instance, a liquid ether is added to a suspension or slurry of an aryllithium compound in an inert liquid hydrocarbon, and that amount of said ether has been added which complexes with the amount of aryllithium compound present to form the etherate, conversion of the suspension or slurry to a solution is completed. No more of the liquid ether need be added. It is desirable, however, to add slightly more of the ether than is stoichiometrically required to react with the amount of aryllithium compound present and this does not adversely affect the desired stability of the resulting solution. Thus, by way of example, approximately 2 moles of diethyl ether are stoichiometrically required to react with 3 moles of phenyllithium. Hence, a suspension or slurry in a given volume of benzene containing 3 moles of phenyllithium will be converted to a solution upon the addition to the slurry of 2 moles of diethyl ether to provide a stable solution. The addition, however, of even 3 or 4 moles of diethyl ether instead of 2 moles to a phenyllithium slurry in an adequate amount of benzene will still produce a solution having excellent stability. Losses not in excess of 5% in storage in sealed cans over a period of 10 months represent good stability, but pursuant to our invention materially greater stability is possible as the foregoing and the following examples show. Generally speaking, in the novel solutions of our invention, for best results, the liquid ether will be present in proportions at least sufficient to complex with the amount of aryllithium compound present but not more than about twice the amount required to form said complex.

The following examples are illustrative of the above-described procedures which have been found to be highly useful in the production of the stable solutions of aryllithium compounds pursuant to the present invention. It will be understood that said examples are only illustrative and that various changes may be made therein in the light of the guiding principles disclosed above without in any manner departing from the fundamental teachings contained herein.

*Example 1*

Into an argon-swept, 5 liter 3-necked round bottom flask equipped with mechanical stirrer, reflux condenser, and 1 liter graduated dropping funnel (also argon swept) was placed a solution of 633 g. (4.03 moles) of bromobenzene in 1.3 liters of dry n-heptane.[1] A volume of 1875 cc. of a 2.15 molar n-butyllithium solution in n-heptane was transferred via the dropping funnel to the bromobenzene solution in the flask over a 30 minute period. The dropping funnel was then exchanged for a thermometer and heating was begun. Reaction began at about 80° C. with the formation of a copious precipitate and evolution of heat. Reaction was complete within a one-half to one hour period. At this point the Gilman Color Test IIA[2] was negative. The contents of the flask were then cooled to below 10° C. The liquid solution was filtered away from the product mixture and the solid washed with an additional liter of n-heptane. The remaining solid residue was treated with a mixture of 142 ml. of anhydrous ethyl ether and 1 liter of pure, dry benzene. The mixture was stirred thoroughly and then filtered. A volume of clear light yellow solution of 1100 ml. with a total base titer of 0.77 molar was obtained. The solid residue was again treated with a mixture of 141 ml. of anhydrous ethyl ether in 500 ml. benzene, stirred thoroughly and filtered. A volume of 1150 ml. of 1.42 molar solution was obtained. From these two solutions the total recovered yield of phenyllithium (on n-butyllithium) was 62 percent. Room temperature storage of this solution in a sealed can for a 2 year period showed only a 2 percent loss in assay.

*Example 2*

Into an argon-swept 5 liter stainless steel resin flask equipped with a 4-necked glass top, mechanical stirrer, gas inlet tube for argon and a stainless steel beaker filter with a long access tube [3], were placed 616 g. of a 15 percent lithium dispersion in a petrolatum (20%) mineral oil (65%) mixture, the lithium metal containing two weight percent sodium, and 1.5 liters of dry n-heptane. The mixture in the flask was thoroughly stirred for 10–15 minutes and then stirring was stopped and the metal allowed to rise to the top of the mixture. The liquid was then filtered off through the beaker filter under a slight pressure of argon gas. This treatment removed approximately 90 percent of the oil and petrolatum. The reaction vessel was equipped with a reflux condenser, thermometer and 500 ml. graduated dropping funnel (condenser and dropping funnel openings protected by argon). A volume of 1500 ml. of anhydrous ethyl ether was added to the lithium metal in the reaction vessel and the mixture stirred thoroughly. A solution of 675 g. (6 moles) of chlorobenzene in 1 liter of anhydrous ethyl ether was then added to the stirred contents of the flask over a 4 hour period. After 1 hour of additional stirring the solution was filtered away from the excess metal and by-product lithium chloride. The filtrate (ca. 2.5 liters of a 2.2 molar solution) was collected in another 5 liter argon-swept flask equipped with a mechanical stirrer, thermometer and reflux condenser surmounted by a gas inlet tube (with stopcock) connected, through a 2 liter filter flask acting as a trap, a drying tower of molecular sieves, a manometer, and a cartesian-type manostat, to a water aspirator. About 1500 ml. of ether was distilled off at approximately 150 mm. pressure. The argon-inlet tube to the 5 liter flask was opened enough to provide a slight bleed of gas during the distillation. 2000 ml. of dry benzene was then added to the flask and distillation continued (at 125 mm. pressure) until the temperature of the boiling solution remained constant at 37° C. for approximately 15 minutes. The mixture was cooled to room temperature, and the clear product solution filtered away from the precipitated lithium chloride. A volume of 2735 ml. of 1.8 molar solution was obtained. The yield of recovered phenyllithium was 82 percent (based on chlorobenzene). A sample of this solution was analyzed for ether content and a phenyllithium-ether molar ratio of approximately 3:2 established for the solution. The solution was stored in a sealed can for ten months at room temperature and on analysis at the end of this period the assay of the clear solution was found to be 1.8 molar indicating no loss of phenyllithium.

---

[1] Phillips "Pure" Grade.

[2] Gilman, H., and Swiss, J., JACS, 62, 1847 (1940).

[3] Micrometallic Corp., porosity "H."

Example 3

Into an argon-swept 500 ml. 3-necked round bottom flask equipped with mechanical stirrer, reflux condenser, and 100 ml. graduated dropping funnel, were placed 35 g. of a lithium dispersion (30 percent in mineral oil), 140 ml. of dry benzene, and 60 ml. of anhydrous ethyl ether. The lithium metal was admixed with two weight percent of sodium just prior to dispersing. A volume of 63 ml. of chlorobenzene [4] was added to the stirred contents of the flask over a half hour period while maintaining the temperature at between 30 and 35° C. After stirring the mixture for an additional half hour, the solution was filtered away from the excess metal and lithium chloride. A yield of 240 ml. of a 2.26 molar solution was obtained (87.5% yield based on chlorobenzene). The solution contained no unreacted chlorobenzene, and 1.5 grams per liter of lithium chloride. After a storage period of 6 weeks the solution showed no change in phenyllithium assay.

In connection with Examples 2 and 3, wherein lithium metal is utilized in the practice of the disclosed procedures, it may be observed that it is highly advantageous to utilize the lithium metal in highly reactive form. The particle size of the lithium metal, thus, for best results, should be in the range of 1 to 100 microns and this may be accomplished by vigorously agitating molten lithium metal in a hot (190–220 degrees C.) mineral oil medium.

In connection with the procedures of the foregoing examples, it may be noted that it has also been discovered that the stability of aryllithium compounds, and particularly phenyllithium, in the form of the solutions thereof in the hydrocarbon-ether mixtures, is greatest when the concentration of unreacted chloro- or bromobenzene in said solutions is low. It has been found that one way to achieve this result is to utilize lithium metal with a small amount of added sodium metal. The sodium metal may be added, conveniently, to the lithium prior to the melting and dispersion operation. Generally speaking, at least one weight percent of sodium should be added to the lithium and it is desirable that the amount of the sodium preferably be from 2 to 3 weight percent. The effect of the addition of the sodium metal is to increase the reactivity of the lithium metal in the reactions here involved, resulting in shorter reaction times and higher yields. These higher yields are not only desirable, per se, but also because they result in a low concentration of unreacted chloro- or bromobenzene in the final phenyllithium solution, with a consequent high stability. It has also been noted that the added sodium results in the formation of a lithium chloride or bromide of a larger particle size which is a distinct advantage in removing the solid lithium halide from the phenyllithium solution, either by decantation or filtration.

What we claim as new and desire to protect by Letters Patent of the United States is:

1. A method of preparing highly stable solutions of aryllithium compounds which comprises providing a suspension of the aryllithium compound in an inert liquid hydrocarbon, and then adding a liquid ether, selected from the group consisting of normally liquid lower alkyl ethers, tetrahydrofuran and tetrahydropyran, to said suspension in an amount in the range of that amount which is substantially just sufficient to convert said suspension into a solution and not substantially more than twice said amount.

2. A method of preparing highly stable solutions of phenyllithium which comprises providing a suspension of phenyllithium in an inert liquid hydrocarbon, and then adding a normally liquid lower alkyl straight chain ether to said suspension in an amount in the range of that amount which is substantially just sufficient to convert said suspension into a solution and not substantially more than twice said amount.

3. A method of preparing highly stable solutions of phenyllithium which comprises providing a suspension of phenyllithium in benzene, and then adding diethyl ether to said suspension in an amount in the range of that amount which is substantially just sufficient to convert said suspension into a solution and not substantially more than twice said amount.

4. A method of preparing highly stable solutions of phenyllithium which comprises providing a mixture of a dispersion of finely divided lithium metal in mineral oil, removing most of mineral oil, admixing diethyl ether with the remaining lithium metal dispersion and then adding a solution in diethyl ether of a member selected from the class consisting of monochlorobenzene and monobromobenzene, filtering to remove the resulting solid lithium halide and any unreacted lithium metal, distilling off a major amount of the diethyl ether under reduced pressure, adding benzene and continuing the distillation until the temperature of the boiling solution remains constant at 37 degrees C. at 125 mm. pressure for about 15 minutes, the diethyl ether being present in amount substantially at least to complex with the phenyllithium but not in excess of about twice said amount, cooling and filtering off any precipitated lithium halide.

5. A method of claim 4, wherein the lithium metal dispersion contains added sodium metal in amount up to about 3% by weight of said dispersion.

6. A method of preparing highly stable solutions of aryllithium compounds which comprises providing a mixture of a finely divided suspension of lithium metal in a liquid ether, selected from the group consisting of normally liquid lower alkyl ethers, tetrahydrofuran and tetrahydropyran, and an inert liquid hydrocarbon, the liquid ether comprising 50–30 volume percent and the inert liquid hydrocarbon comprising 50–70 percent of said solvent mixture, admixing therewith a haloaryl compound, and then filtering out the resulting solid lithium halide.

7. A method of preparing highly stable solutions of phenyllithium which comprises providing a mixture of a lithium metal dispersion in mineral oil with a solvent mixture comprising 50–70 volume percent benzene and 50–30 volume percent diethyl ether, admixing therewith monohalobenzene, and then filtering out the solid lithium halide.

8. A method of preparing highly stable solutions of phenyllithium which comprises providing a mixture of a dispersion of lithium and sodium in a mineral oil, the particle size of said metals being in the range of 1 to 100 microns, the sodium constituting from about 1 to about 3%, by weight, of the lithium present in said dispersion, with a solvent mixture comprising 50–70 volume percent benzene and 50–30 volume percent diethyl ether, admixing therewith a member selected from the group consisting of monochlorobenzene and monobromobenzene, and then filtering out the resulting solid lithium halide.

9. A stable solution of an aryllithium compound in a mixture of an inert liquid hydrocarbon and a liquid ether, selected from the group consisting of normally liquid lower alkyl ethers, tetrahydrofuran and tetrahydropyran, the aryllithium compound and the liquid hydrocarbon being present in proportions which, in the absence of said ether, would comprise a suspension of said aryllithium compound in said inert liquid hydrocarbon, the ether being present in amount in the range of that amount which is substantially just sufficient to form a solution not substantially more than twice said amount.

10. A stable solution of phenyllithium in a mixture of benzene and diethyl ether, the phenyllithium and the benzene being present in proportions which, in the absence of said diethyl ether, would comprise a suspension of the phenyllithium in the benzene, the diethyl ether being present in amount less than that of the benzene but in the range of that amount which is substantially just sufficient ---
[4] Fisher purified grade.

to form a solution and not substantially more than twice said amount.

11. A stable 0.7 to 2.5 molar solution of phenyllithium in a mixture of benzene and diethyl ether, the benzene and the diethyl ether being present in a volume ratio to each other of 100 parts of benzene to from 8 to 65 parts of diethyl ether, subject to the proviso that, in said solution, the diethyl ether is present in amounts in the range of that amount which is substantially just sufficient to complex with the phenyllithium but not substantially in excess of twice that amount.

12. A stable solution of phenyllithium in a mixture of benzene and diethyl ether, the phenyllithium and the benzene being present in proportions which, in the absence of said diethyl ether, would comprise a suspension of the phenyllithium in the benzene, the diethyl ether being present in a ratio of from 2 to 4 moles per 3 moles of the phenyllithium.

References Cited by the Examiner

UNITED STATES PATENTS

| | | | |
|---|---|---|---|
| 2,027,000 | 1/36 | Scott | 260—665 |
| 3,060,241 | 10/62 | Rauhut et al. | 260—665 |

FOREIGN PATENTS 871,613  6/61  Great Britain.

OTHER REFERENCES

Mikhailov: Chemical Abstracts, volume 47, page 3259(d) (1953).

Mikhailov: Chemical Abstracts, volume 53, page 21843(h) (1959).

National Distillers and Chemical Corporation, 1,096,906 (Germany), Jan. 12, 1961 (3 pages spec.) (corresponding).

TOBIAS E. LEVOW, *Primary Examiner.*